(12) United States Patent
Beatty et al.

(10) Patent No.: US 9,710,337 B1
(45) Date of Patent: Jul. 18, 2017

(54) SYSTEMS AND METHODS FOR RESTORING WEB PARTS IN CONTENT MANAGEMENT SYSTEMS

(71) Applicant: Symantec Corporation, Mountain View, CA (US)

(72) Inventors: Louis Beatty, Ormond Beach, FL (US); Deepak Saraf, Windermere, FL (US)

(73) Assignee: Veritas Technologies, Mountain View, CA (US)

( * ) Notice: Subject to any disclaimer, the term of this patent is extended or adjusted under 35 U.S.C. 154(b) by 541 days.

(21) Appl. No.: 14/231,419

(22) Filed: Mar. 31, 2014

Related U.S. Application Data

(63) Continuation of application No. 12/722,849, filed on Mar. 12, 2010, now Pat. No. 8,726,147.

(51) Int. Cl.
  *G06F 11/00* (2006.01)
  *G06F 11/14* (2006.01)
(52) U.S. Cl.
  CPC ................... *G06F 11/1458* (2013.01)
(58) Field of Classification Search
  CPC .............................. G06F 11/1458; G06F 3/048
  See application file for complete search history.

(56) References Cited

U.S. PATENT DOCUMENTS

| | | | | |
|---|---|---|---|---|
| 6,804,674 B2 * | 10/2004 | Hsiao | ................ | G06F 17/30094 |
| 7,139,969 B1 * | 11/2006 | Ruble | ............... | G06F 17/30873 |
| | | | | 707/E17.111 |
| 7,281,202 B2 * | 10/2007 | Croney | ............... | G06F 17/3089 |
| | | | | 707/E17.116 |
| 7,325,188 B1 * | 1/2008 | Covington | .......... | G06F 17/3089 |
| | | | | 707/E17.116 |
| 7,464,369 B1 * | 12/2008 | Banerjee | ................... | G06F 8/38 |
| | | | | 715/209 |
| 7,480,921 B1 | 1/2009 | Vigesaa et al. | | |
| 7,669,212 B2 * | 2/2010 | Alao | ................. | G06Q 30/0209 |
| | | | | 725/32 |
| 7,917,474 B2 * | 3/2011 | Passey | ................ | G06F 11/2094 |
| | | | | 707/655 |
| 2002/0049603 A1 | 4/2002 | Mehra et al. | | |
| 2002/0069209 A1 | 6/2002 | Kurihara et al. | | |

(Continued)

*Primary Examiner* — Stephen Hong
*Assistant Examiner* — Marshon Robinson
(74) *Attorney, Agent, or Firm* — FisherBroyles LLP

(57) ABSTRACT

A computer-implemented method for restoring web parts in content management systems may include identifying a backup of a content management system. The computer-implemented method may also include identifying an instruction to restore at least one web part of the content management system. The computer-implemented method may further include retrieving the web part. The computer-implemented method may additionally include identifying at least one object referenced by the web part. The computer-implemented method may also include recreating the object within the content management system. The computer-implemented method may additionally include updating the web part to reference the recreated object. The computer-implemented method may also include restoring the web part to the content management system. Various other methods, systems, and computer-readable media are also disclosed.

20 Claims, 6 Drawing Sheets

(56) References Cited

U.S. PATENT DOCUMENTS

| | | | |
|---|---|---|---|
| 2002/0147645 A1* | 10/2002 | Alao | G06Q 30/0209 705/14.54 |
| 2003/0018624 A1* | 1/2003 | Hsiao | G06F 17/30094 |
| 2003/0225699 A1 | 12/2003 | Stefik et al. | |
| 2004/0215709 A1 | 10/2004 | Basani et al. | |
| 2004/0268228 A1* | 12/2004 | Croney | G06F 17/3089 715/255 |
| 2005/0010557 A1 | 1/2005 | Dettinger et al. | |
| 2005/0114333 A1* | 5/2005 | Nagano | G06F 21/10 |
| 2006/0107314 A1 | 5/2006 | Cataldi | |
| 2006/0212790 A1* | 9/2006 | Perantatos | G06F 3/0486 715/234 |
| 2007/0028162 A1* | 2/2007 | Griffin | G06F 17/3089 715/235 |
| 2007/0192733 A1* | 8/2007 | Horiuchi | G06F 3/0483 715/788 |
| 2007/0226314 A1 | 9/2007 | Eick et al. | |
| 2007/0226734 A1* | 9/2007 | Lin | G06F 9/44526 717/177 |
| 2007/0271330 A1* | 11/2007 | Mattox | G06Q 10/00 709/203 |
| 2008/0040681 A1 | 2/2008 | Synstelien et al. | |
| 2008/0159530 A1* | 7/2008 | Rasti | G06F 21/34 380/51 |
| 2008/0244681 A1* | 10/2008 | Gossweiler | H04N 21/235 725/133 |
| 2008/0276279 A1* | 11/2008 | Gossweiler | H04N 21/235 725/46 |
| 2008/0294751 A1 | 11/2008 | Dreiling | |
| 2008/0300980 A1* | 12/2008 | Benjamin | G06Q 30/00 705/14.73 |
| 2009/0043907 A1* | 2/2009 | Peterson | G06F 3/0236 709/231 |
| 2009/0077481 A1 | 3/2009 | Ishii | |
| 2010/0107053 A1* | 4/2010 | Kanzaki | G06F 17/2247 715/234 |
| 2010/0138316 A1* | 6/2010 | Connors | G06F 9/4443 705/26.1 |
| 2010/0250495 A1* | 9/2010 | Dile | G06F 11/1451 707/640 |

* cited by examiner

SYSTEMS AND METHODS FOR RESTORING WEB PARTS IN CONTENT MANAGEMENT SYSTEMS

CROSS REFERENCE TO RELATED APPLICATION

This application is a continuation of U.S. application Ser. No. 12/722,849, filed 12 Mar. 2010, the disclosure of which is incorporated, in its entirety, by this reference.

BACKGROUND

In the digital age, organizations must manage increasingly large volumes of data. Content management systems may help members of an organization to access shared organizational data. By providing each member with a customized view of the organization's data, content management systems may provide flexible and user-centric portals to the data relevant to that member.

Some content management systems may maintain a site or page for each user of the system. A site may include one or more components (such as "web parts") which may refer to objects that draw on common data (e.g., employee records, calendar data, etc.) to display to a user. In some cases, a user may wish to restore a site from a backup of a content management system. However, restoring a web part of a site may require restoring objects to which the web part refers, and an object restored within a content management system may have a new identification to which the web part must refer.

Traditional backup systems may perform granular backups on a content management system, retrieving information about web parts via an Application Programming Interface ("API") of the content management system and backing up that information along with metadata describing the relationships between web parts and the objects to which the web parts refer. Unfortunately, this may result in increased backup time and resource consumption. Accordingly, the instant disclosure identifies and addresses a need for restoring web parts in content management systems (e.g., from a monolithic backup).

SUMMARY

As will be described in greater detail below, the instant disclosure generally relates to systems and methods for restoring web parts in content management systems. Embodiments of the instant disclosure may restore web parts in content management systems by retrieving a web part to be restored, identifying at least one object to which the web part refers, recreating the object in the content management system, and then updating the web part to refer to the recreated object. For example, a method may include identifying a backup of a content management system, identifying an instruction to restore at least one web part of the content management system, retrieving the web part, identifying at least one object referenced by the web part, recreating the object within the content management system, updating the web part to reference the recreated object, and then restoring the web part to the content management system.

Identifying the instruction to restore at least one web part of the content management system may happen in a variety of contexts. For example, a user may select to restore a site of the content management system that includes the web part. Accordingly, identifying the instruction to restore the web part may entail identifying an instruction to restore a site of the content management system. In some examples, retrieving the web part may entail retrieving at least one web part included in the site. Retrieving the web part may include caching the web part.

Updating the web part to reference the recreated object may include looking up an identifier of the recreated object. In some examples, looking up the identifier of the recreated object may include identifying a unique attribute of the object and searching for an object in the content management system with the unique attribute. The unique attribute may include any suitable attribute, such as a uniform resource locator.

Restoring the web part to the content management system may include creating the web part in the content management system. Additionally or alternatively, restoring the web part to the content management system may include modifying a pre-generated web part in the content management system.

In some examples, a system for restoring web parts in content management systems may include an identification module, a retrieval module, a recreation module, an updating module, a restoration module, and at least one processor. The identification module may be programmed to identify a backup of a content management system and to identify an instruction to restore at least one web part of the content management system. The retrieval module may be programmed to retrieve the web part. The recreation module may be programmed to identify at least one object referenced by the web part and to recreate the object within the content management system. The updating module may be programmed to update the web part to reference the recreated object. The restoration module may be programmed to restore the web part to the content management system.

The identification module may be programmed to identify the instruction to restore at least one web part of the content management system in a variety of contexts. For example, a user may select to restore a site of the content management system that includes the web part. Accordingly, the identification module may identify the instruction to restore the web part in the course of identifying an instruction to restore a site of the content management system. In some examples, the retrieval module may be programmed to retrieve the web part as part of retrieving at least one web part included in the site. The retrieval module may be programmed to cache the web part as part of retrieving the web part.

The updating module may be programmed to update the web part to reference the recreated object by looking up an identifier of the recreated object. In some examples, the updating module may be programmed to look up the identifier of the recreated object by identifying a unique attribute of the object and searching for an object in the content management system with the unique attribute. The unique attribute may include any suitable attribute, such as a uniform resource locator.

The restoration module may be programmed to restore the web part to the content management system by creating the web part in the content management system. Additionally or alternatively, the restoration module may be programmed to restore the web part to the content management system by modifying a pre-generated web part in the content management system.

In some embodiments, a computer-readable-storage medium may include one or more computer-executable instructions that, when executed by at least one processor of a computing device, may cause the computing device to identify a backup of a content management system, identify an instruction to restore at least one web part of the content management system, retrieve the web part, identify at least one object referenced by the web part, recreate the object within the content management system, update the web part to reference the recreated object, and then restore the web part to the content management system.

In some examples, the computer-executable instructions may cause the computing device to identify the instruction to restore the web part of the content management system as part of identifying an instruction to restore a site of the content management system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
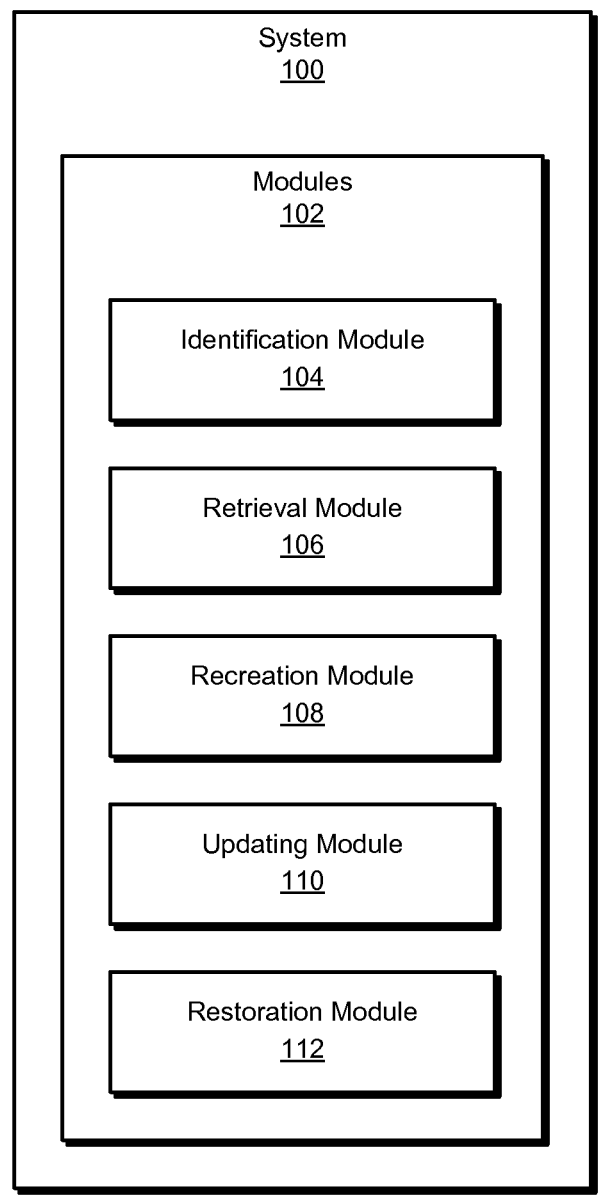
FIG. 1 is a block diagram of an exemplary system for restoring web parts in content management systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for restoring web parts in content management systems. Systems and methods described herein may restore a web part to a content management system (e.g., as part of restoring a site to a content management system) by retrieving a web part from a backup of the content management system and identifying objects to which the web part refers. Systems and methods described herein may also recreate the objects within the content management system and remap the web part to refer to the recreated objects. Systems and methods described herein may additionally restore the web part to the content management system. By updating a web part (e.g., after retrieving and caching the web part) to refer to recreated versions of the objects on which it depends, systems and methods described herein may restore a web part from a monolithic backup (e.g., a backup of a database of the content management system), preserving the characteristics of the web part without requiring multiple passes when backing up or restoring the web part.

Figure 2:
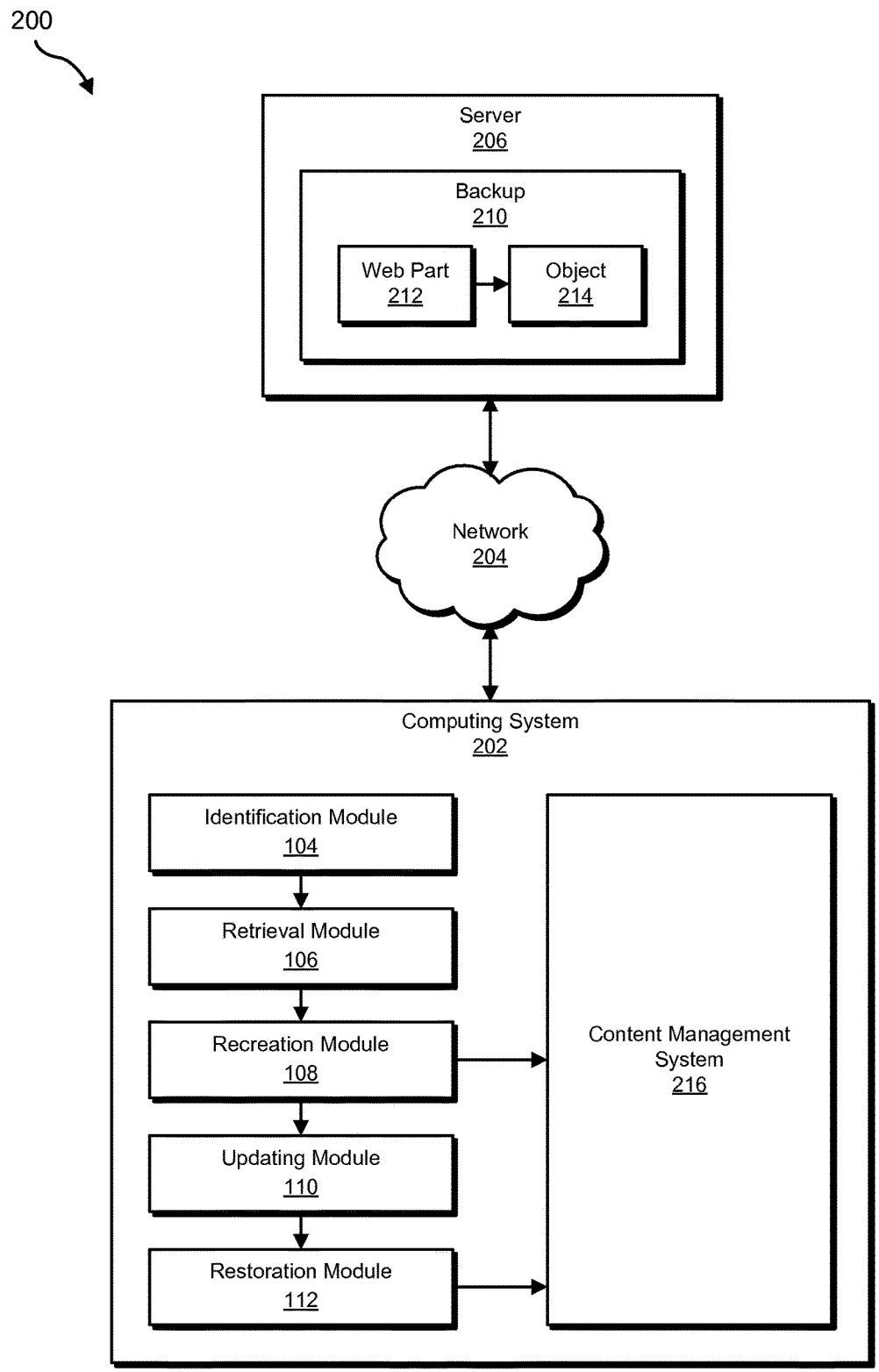
FIG. 2 is a block diagram of another exemplary system for restoring web parts in content management systems.
Figure 3:
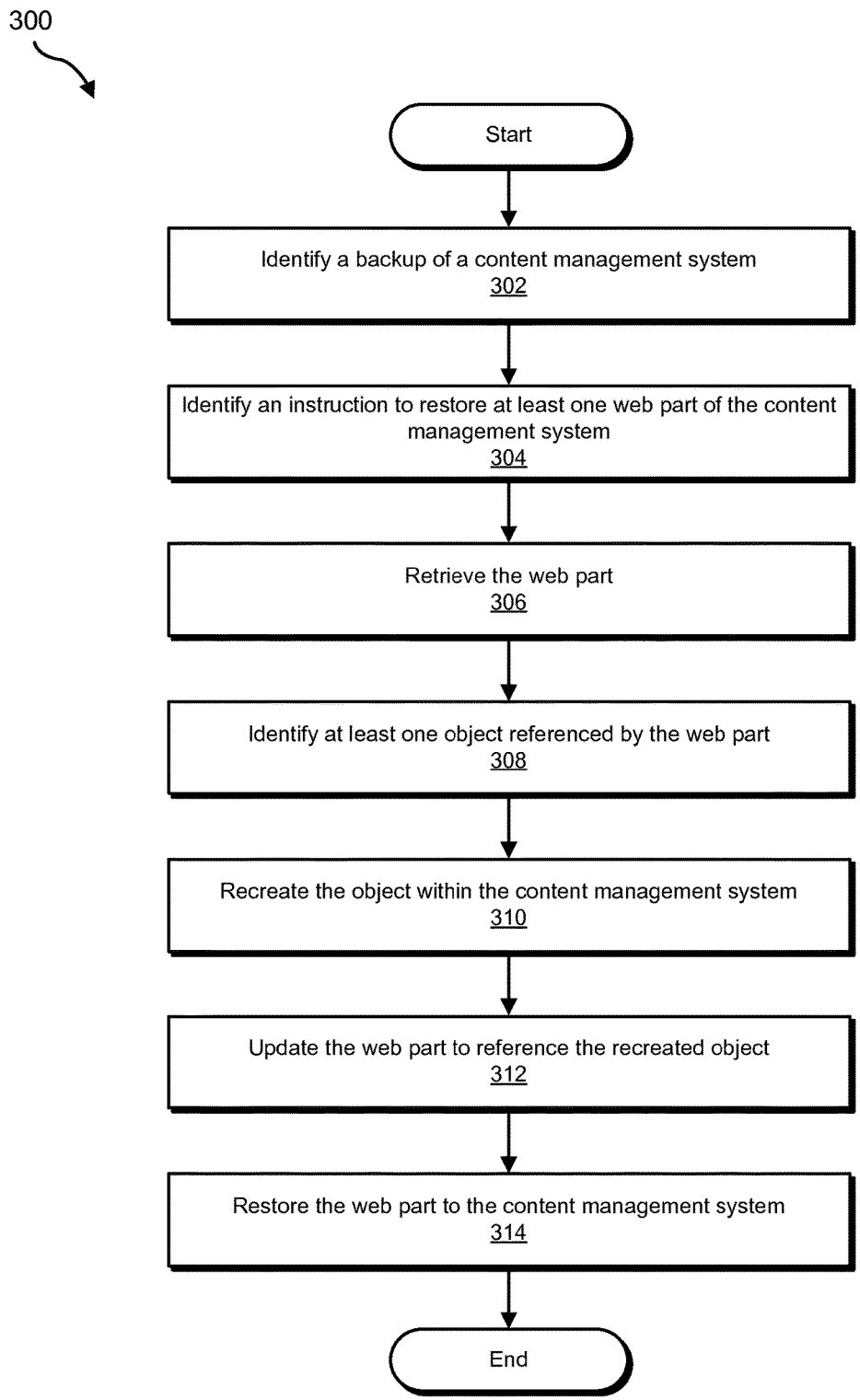
FIG. 3 is a flow diagram of an exemplary method for restoring web parts in content management systems.
Figure 4:
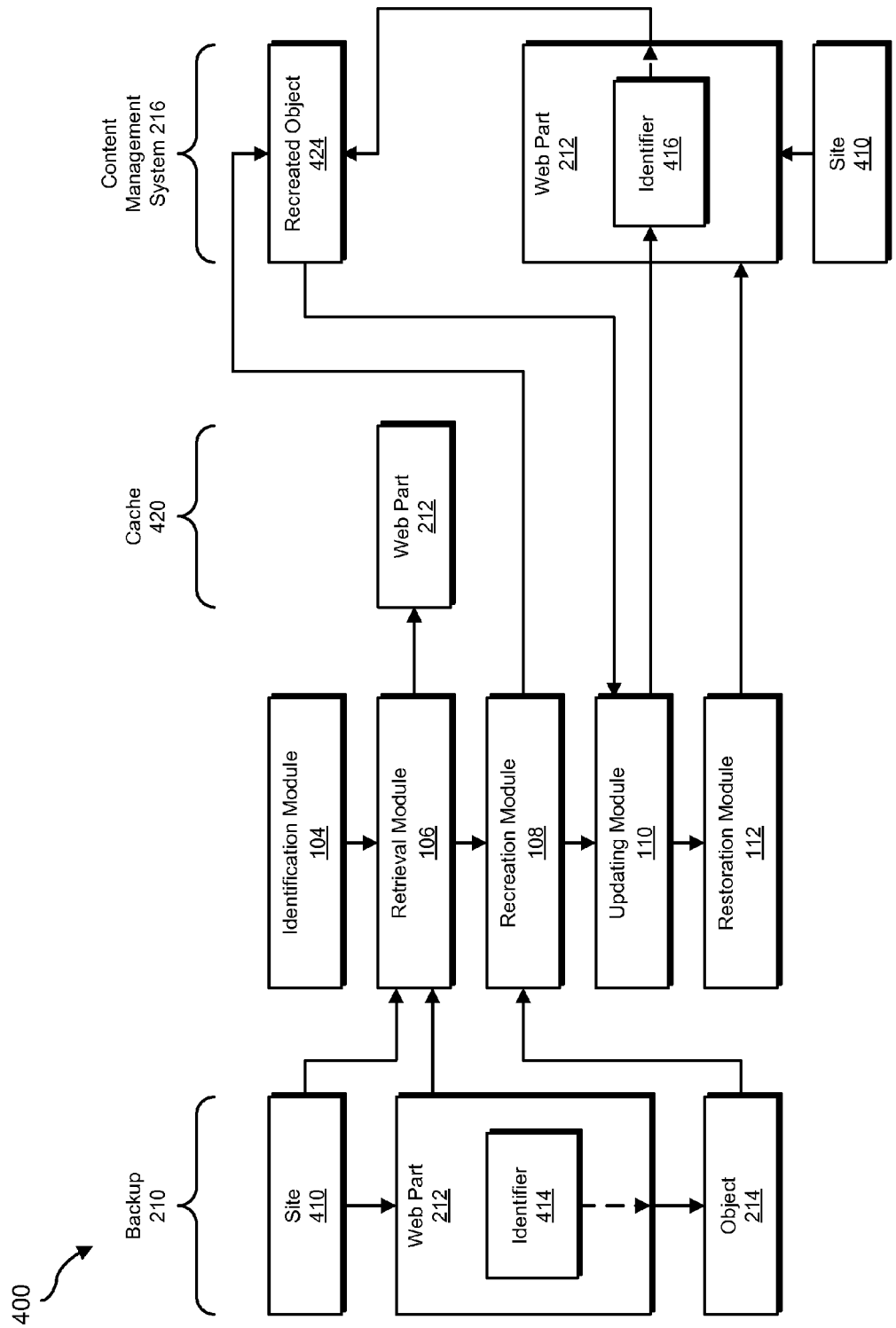
FIG. 4 is a block diagram of an exemplary system for restoring web parts in content management systems.

The following will provide, with reference to FIGS. 1-2 and 4, detailed descriptions of exemplary systems for restoring web parts in content management systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for restoring web parts in content management systems. As illustrated in this figure, exemplary system 100 may include one or more modules 102 for performing one or more tasks. For example, and as will be explained in greater detail below, exemplary system 100 may include an identification module 104 programmed to identify a backup of a content management system and to identify an instruction to restore at least one web part of the content management system. Exemplary system 100 may also include a retrieval module 106 programmed to retrieve the web part. Exemplary system 100 may additionally include a recreation module 108 programmed to identify at least one object referenced by the web part and to recreate the object within the content management system. Exemplary system 100 may further include an updating module 110 programmed to update the web part to reference the recreated object.

In addition, and as will be described in greater detail below, exemplary system 100 may include a restoration module 112 programmed to restore the web part to the content management system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a server 206 via a network 204. In one embodiment, and as will be described in greater detail below, computing system 202 may include identification module 104, retrieval module 106, recreation module 108, updating module 110, and restoration module 112.

Identification module 104 may identify a backup of a content management system. For example, identification module 104 may identify a backup 210 of a content management system 216. Identification module 104 may also identify an instruction to restore at least one web part of the content management system. For example, identification module 104 may identify an instruction to restore a web part 212.

Retrieval module 106 may retrieve the web part. For example, retrieval module 106 may retrieve web part 212 (e.g., from server 206 to computing system 202). Recreation module 108 may identify at least one object referenced by the web part. For example, recreation module 108 may identify an object 214 referenced by web part 212. Recreation module 108 may also recreate the object within the content management system. For example, recreation module 108 may recreate object 214 within content management system 216.

Updating module 110 may update the web part to reference the recreated object. For example, updating module 110 may update web part 212 to reference object 214 as recreated in content management system 216. Restoration module 112 may restore the web part to the content management system. For example, restoration module 112 may restore web part 212 to content management system 216.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of storing backup data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network, a local area network, a personal area network, the Internet, power line communications, a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and server 206.

FIG. 3 is a flow diagram of an exemplary computer-implemented method 300 for restoring web parts in content management systems. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a backup of a content management system. For example, at step 302 identification module 104 may, as part of computing system 202, identify backup 210 of content management system 216.

As used herein, the term "content management system" may refer to any system capable of providing one or more views and/or interfaces for a collection of data. For example, a content management system may provide document checkout services, shared contacts, formatted views of information from a database, collaborative editing services, etc. Examples of content management systems may include, but are not limited to, MICROSOFT SHAREPOINT and IGOOGLE.

Identification module 104 may perform step 302 in any suitable manner. For example, identification module 104 may identify the backup by reading a configuration file that identifies the backup. Additionally or alternatively, identification module 104 may identify the backup by receiving a message from an application that identifies the backup. In some examples the backup may include a monolithic backup of the content management system. For example, the backup may include a backup of a database used by the content management system to store the state and/or components of the content management system.

At step 304 one or more of the systems described herein may identify an instruction to restore at least one web part of the content management system. For example, at step 304 identification module 104 may, as part of computing system 202, identify an instruction to restore web part 212 of content management system 216.

As used herein, the term "web part" may refer to any module, code, gadget, library, and/or page used within a content management system to view, interface with, and/or access underlying data. Examples of web parts may include, but are not limited to, web parts in MICROSOFT SHAREPOINT and/or gadgets in IGOOGLE. For example, a web part may include a portion of code embedded (e.g., directly or by reference) in a web page (such as an ASPX file). In some examples, a page and/or site may include multiple web parts.

Identification module 104 may perform step 304 in any suitable context. For example, identification module 104 may identify the instruction to restore the web part as part of identifying an instruction to restore a site of the content management system. To extend the example, a user may select a site of the content management system to restore from backup. Since the user may have previously configured and/or customized the web parts for the site, the instruction to restore the site may implicitly include an instruction to restore each web part of the site. In some examples, the instruction to restore the site may specify restoring only certain web parts with the site. For example, a user may select a site of the content management system to restore, but may exclude certain web parts included in the site for the restoration. In this example, the web part may include one of the web parts not excluded by the user.

Using FIG. 4 as an example, this figure illustrates an exemplary system 400 for restoring web parts in content management systems. Backup 210 may include a site 410 which may, in turn, include web part 212. Identification module 104 may identify an instruction to restore site 410 to content management system 216, and, accordingly, identify an instruction to restore web part 212 to content management system 216.

Returning to FIG. 3, at step 306 one or more of the systems described herein may retrieve the web part. For example, at step 306 retrieval module 106 may, as part of computing system 202, retrieve web part 212 from server 206. Retrieval module 106 may perform step 306 in any suitable manner. For example, retrieval module 106 may parse and/or query the backup of the content management system to extract the web part. Additionally or alternatively, retrieval module 106 may access the web part from the backup through an appropriate API.

As mentioned earlier, identification module 104 may identify an instruction to restore the web part as part of identifying an instruction to restore a site of the content management system. Accordingly, retrieval module 106 may retrieve the web part as included in the site. In some examples, retrieval module 106 may retrieve all web parts included in the site. Using FIG. 4 as an example, retrieval module 106 may retrieve site 410 and web part 212.

In some examples, retrieval module 106 may cache the web part upon retrieving the web part. For example, retrieval module 106 may retrieve various components of a content management system site, such as a primary page of the site, web parts included in the site, and/or other objects included in the site and/or referred to by the web parts of the site. Retrieval module 106 may restore some of these components directly to the content management system as they are retrieved. However, retrieval module 106 may cache the web part (e.g., along with all web parts of the site) for future manipulation before restoring the web part to the content management system. Using FIG. 4 as an example, retrieval module 106 may cache web part 212 in a cache 420.

Returning to FIG. 3, at step 308 one or more of the systems described herein may identify at least one object referenced by the web part. For example, at step 308 recreation module 108 may, as part of computing system 202, identify object 214 referenced by web part 212. As an additional example, in FIG. 4 recreation module 108 may identify object 214 referenced by web part 212.

As used herein, the term "object" may refer to any component of a content management system which may be referenced by a web part. For example, an object may include a list in MICROSOFT SHAREPOINT.

Recreation module 108 may perform step 308 in any suitable manner. For example, recreation module 108 may identify the object by parsing the web part. Additionally or alternatively, recreation module 108 may identify the object by submitting a query to a database (e.g., in the backup of the content management system) for objects referenced by the web part.

At step 310 one or more of the systems described herein may recreate the object within the content management system. For example, at step 310 recreation module 108 may, as part of computing system 202, recreate object 214 within content management system 216. As an additional example, in FIG. 4 recreation module 108 may recreate object 214 as a recreated object 424 within content management system 216.

Recreation module 108 may perform step 310 in any suitable manner. For example, recreation module 108 may use an API of the content management system to recreate the object. In some contexts, recreation module 108 may recreate the object after the object was retrieved as part of restoring a site that references the web part. Additionally or alternatively, recreation module 108 may have recreated the object before identification module 104 identified an instruction to restore a site that references the web part. In this example, recreation module 108 may identify the object after recreating the object.

At step 312 one or more of the systems described herein may update the web part to reference the recreated object. For example, at step 312 updating module 110 may, as part of computing system 202, update web part 212 to reference object 214 as recreated in content management system 216.

As an additional example, in FIG. 4 updating module 110 may update web part 212 to reference recreated object 424.

Updating module 110 may perform step 312 in any suitable manner. For example, updating module 110 may search the web part for references to the object and replace the references with references to the recreated object.

In some examples, updating module 110 may first look up an identifier of the recreated object (e.g., in order to update the web part with the identifier of the recreated object). Updating module 110 may look up the identifier of the recreated object in any suitable manner. For example, recreation module 108 may have stored the identifier of the recreated object in relation to the web part. Updating module 110 may then look up recreated objects referenced by the web part in a data structure stored by recreation module 108.

Additionally or alternatively, updating module 110 may look up the identifier of the recreated object by identifying a unique attribute of the object (e.g., by parsing the object for a field that will uniquely identify the object, by identifying metadata of the object that will uniquely identify the object, etc.) and searching for an object in the content management system with the unique attribute (e.g., by querying the content management system for the unique attribute and identifying the recreated object returned in response to the query). In some examples, the unique attribute may include a uniform resource locator of the object (e.g., the object may include the uniform resource locator as metadata). In some examples, updating module 110 may also link fields in the list view in MICROSOFT SHAREPOINT to match the web part.

Using FIG. 4 as an example, updating module 110 may look up an identifier 416 of recreated object 424. Updating module 110 may replace identifier 414 (e.g., within web part 212 in cache 420) with identifier 416 so that web part 212 may reference recreated object 424 in content management system 216.

At step 314 one or more of the systems described herein may restore the web part to the content management system. For example, at step 314 restoration module 112 may, as part of computing system 202, restore web part 212 to content management system 216. As an additional example, in FIG. 4 restoration module 112 may restore web part 212 (e.g., from cache 420) to content management system 216.

Restoration module 112 may perform step 314 in a variety of ways. For example, restoration module 112 may restore the web part to the content management system by creating the web part in the content management system. For example, restoration module 112 may create a new web part in the content management system identical to the web part. In another example, restoration module 112 may restore the web part to the content management system by modifying a pre-generated web part in the content management system. For example, when restoring a site to the content management system, the restoration process may result in a template web part (e.g., taking the place of the web part). For example, in the process of restoring a site, a content management system may use a template site (with template web parts) to create a base site on which to perform the restoration. Restoration module 112 may accordingly modify the template web part to conform to the attributes of the web part.

In some examples, restoration module 112 may add a "view" structure (e.g., of MICROSOFT SHAREPOINT) for the web part to ensure that the view of the restored web part is the same as it was in the original site. In some additional examples, restoration module 112 may apply permission flags to the restored web part as they were at the time of backup. This may ensure that the web part is modifiable.

As mentioned earlier, restoring the web part may occur in the context of restoring a site that includes the web part. Systems and methods described herein may accordingly serve for restoring a site of a content management system. For example, systems and methods described herein may allow a user to select a site (e.g., an ASPX file used by MICROSOFT SHAREPOINT) to restore. Systems and methods described herein may then generate a list of web parts needed for the site as well as a list of objects needed for the web parts. Systems and methods described herein may subsequently cache the web parts and restore the site (e.g., the ASPX file). Systems and methods described herein may then remap (e.g., update) the web parts to refer to restored objects on which the web parts depend, and, finally, restore the updated web parts to the content management system. In some examples, systems and methods described herein may allow a user to selectively restore web parts during the restoration of a web site.

By updating a web part (e.g., after retrieving and caching the web part) to refer to recreated versions of the objects on which it depends, systems and methods described herein may restore a web part from a monolithic backup (e.g., a backup of a database of the content management system), preserving the characteristics of the web part without requiring multiple passes when backing up or restoring the web part.

Figure 5:
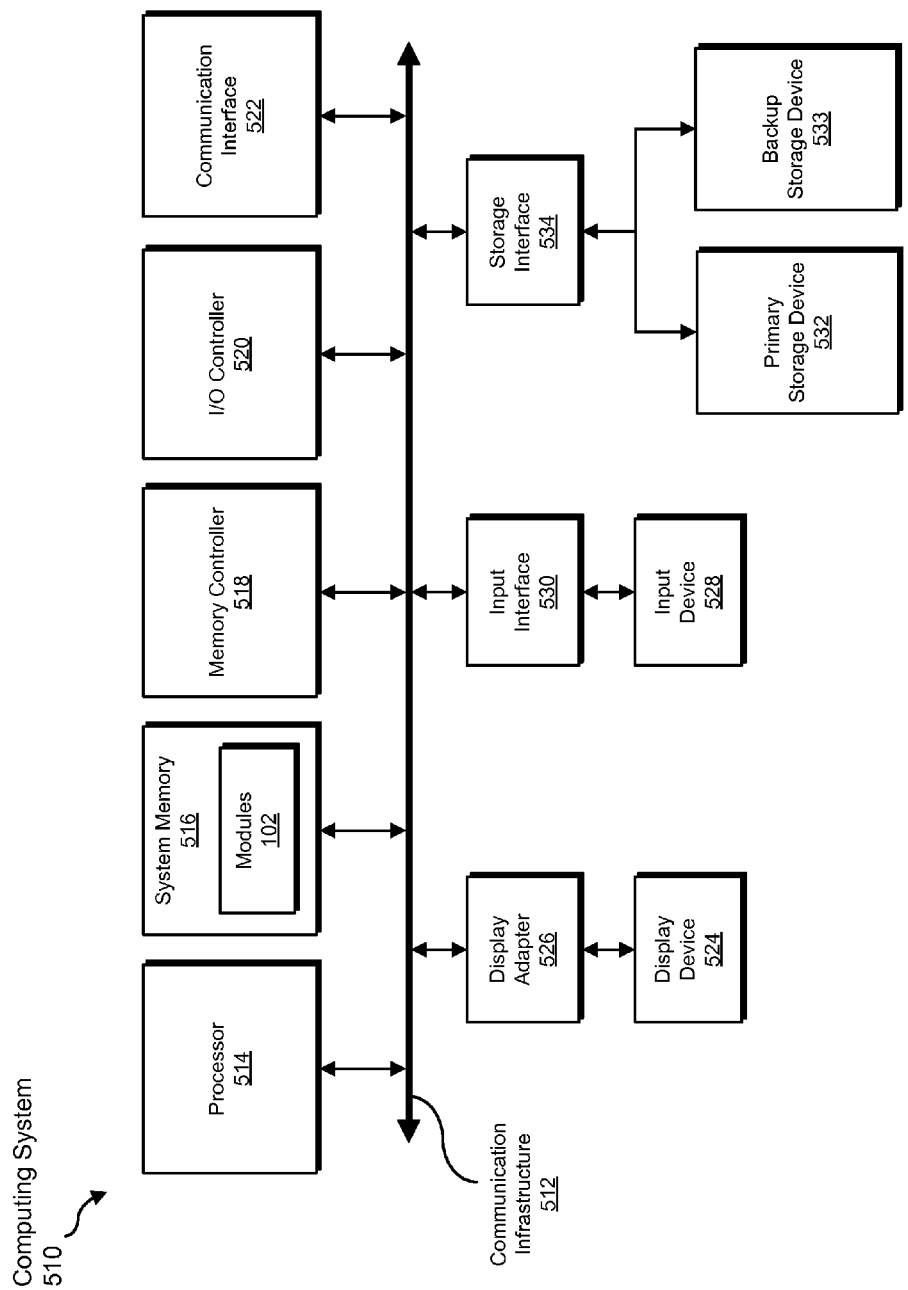
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, retrieving, caching, recreating, updating, looking up, searching, restoring, creating, and/or modifying steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, retrieving, caching, recreating, updating, looking up, searching, restoring, creating, and/or modifying.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, retrieving, caching, recreating, updating, looking up, searching, restoring, creating, and/or modifying steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, retrieving, caching, recreating, updating, looking up, searching, restoring, creating, and/or modifying steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, retrieving, caching, recreating, updating, looking up, searching, restoring, creating, and/or modifying steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, retrieving, caching, recreating, updating, looking up, searching, restoring, creating, and/or modifying steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
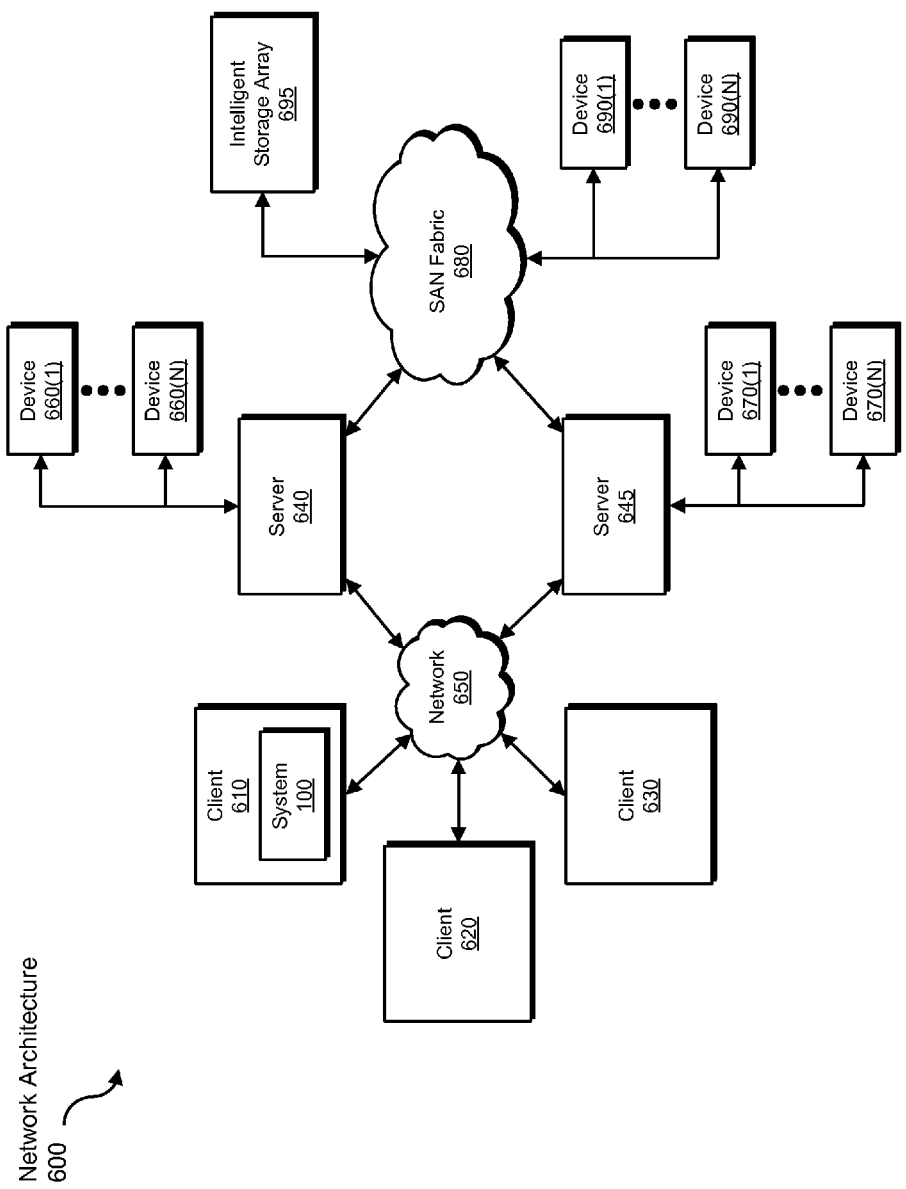
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, retrieving, caching, recreating, updating, looking up, searching, restoring, creating, and/or modifying steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for restoring web parts in content management systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a system for restoring web parts in a content management system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring web parts in content management systems, at least a portion of the method being performed by a computing device comprising at least one processor, the method comprising:

identifying a backup of a content management system;
identifying an instruction to restore at least one customized web part of the content management system by identifying an instruction to restore a web site of the content management system, wherein the customized web part has been customized for the web site;
retrieving the customized web part;
identifying at least one object that is referenced by the customized web part and that does not comprise a web part or an identifier of a web part;
recreating the object within the content management system;
creating an updated web part by updating the customized web part to reference the recreated object;
restoring the updated web part to the content management system.

2. The computer-implemented method of claim 1, wherein the customized web part comprises a module, gadget, library, page, and/or code used within the content management system to provide access to data stored in the content management system.

3. The computer-implemented method of claim 1, wherein retrieving the customized web part comprises retrieving at least one web part included in the web site.

4. The computer-implemented method of claim 1, wherein retrieving the customized web part comprises caching the customized web part.

5. The computer-implemented method of claim 1, wherein updating the customized web part to reference the recreated object comprises looking up an identifier of the recreated object.

6. The computer-implemented method of claim 5, wherein looking up the identifier of the recreated object comprises:
identifying a unique attribute of the object;
searching for an object in the content management system with the unique attribute.

7. The computer-implemented method of claim 6, wherein the unique attribute comprises a uniform resource locator.

8. The computer-implemented method of claim 1, wherein creating the updated web part comprises:
creating, within the content management system, a new web part that is identical to the customized web part;
updating the new web part.

9. The computer-implemented method of claim 1, wherein restoring the updated web part to the content management system comprises:
using a template site with a pre-generated template web part to create a base site on which to perform restoration;
modifying the pre-generated web part in the content management system such that the template web part conforms to attributes of the customized web part.

10. The computer-implemented method of claim 1, wherein restoring the updated web part comprises restoring a web site that includes the customized web part.

11. The computer-implemented method of claim 10, wherein restoring the web site comprises:
generating a list of a plurality of web parts needed for the web site and a list of objects needed for the plurality of web parts identified in the list of the plurality of web parts needed for the web site;
remapping each of the plurality of web parts to refer to restored objects on which the plurality of web parts depend, wherein remapping each of the plurality of web parts comprises updating the customized web part to reference the recreated object.

12. The computer-implemented method of claim 11, wherein restoring the web site comprises enabling a user to selectively restore one or more of the plurality of web parts during restoration of the web site.

13. The computer-implemented method of claim 1, wherein updating the customized web part comprises linking fields in a list view of the content management system to match the customized web part.

14. A system for restoring web parts in content management systems, the system comprising:
an identification module that:
identifies a backup of a content management system;
identifies an instruction to restore at least one customized web part of the content management system by identifying an instruction to restore a web site of the content management system, wherein the customized web part has been customized for the web site;
a retrieval module that retrieves the customized web part;
a recreation module that:
identifies at least one object that is referenced by the customized web part and that does not comprise a web part or an identifier of a web part;
recreates the object within the content management system;
an updating module that creates an updated web part by updating the customized web part to reference the recreated object;
a restoration module that restores the updated web part to the content management system;
at least one processor configured to execute the identification module, the retrieval module, the recreation module, the updating module, and the restoration module.

15. The system of claim 14, wherein the customized web part comprises code embedded in a web page of the content management system.

16. The system of claim 15, wherein the web page comprises an ASPX file.

17. The system of claim 14, wherein the retrieval module retrieves the customized web part by retrieving at least one web part included in the web site.

18. The system of claim 14, wherein the retrieval module retrieves the customized web part by parsing and/or querying the backup of the content management system to extract the customized web part.

19. The system of claim 14, wherein the restoration module adds a view structure for the updated web part to ensure, after the updated web part is restored, that a view of the updated web part is identical to the customized web part found in the backup of the content management system.

20. A computer-readable-storage medium comprising one or more computer-executable instructions that, when executed by at least one processor of a computing device, cause the computing device to:
identify a backup of a content management system;
identify an instruction to restore at least one customized web part of the content management system by identifying an instruction to restore a web site of the content management system, wherein the customized web part has been customized for the web site;
retrieve the customized web part;
identify at least one object that is referenced by the customized web part and that does not comprise a web part or an identifier of a web part;

recreate the object within the content management system;
create an updated web part by updating the customized web part to reference the recreated object;
restore the updated web part to the content management system.

\* \* \* \* \*